United States Patent [19]

Massey

[11] 4,421,245
[45] Dec. 20, 1983

[54] CLOSURE ASSEMBLY

[75] Inventor: Steven R. Massey, Olathe, Kans.

[73] Assignee: Gulf & Western Manufacturing Company, Southfield, Mich.

[21] Appl. No.: 463,775

[22] Filed: Feb. 4, 1983

[51] Int. Cl.³ .............................................. B65D 45/00
[52] U.S. Cl. ...................................... 220/328; 220/378
[58] Field of Search ................ 220/328, 378, 327, 325

[56] References Cited

U.S. PATENT DOCUMENTS

| | | | |
|---|---|---|---|
| 2,647,656 | 8/1953 | Frisch | 220/328 |
| 2,761,279 | 9/1956 | Smith | 220/328 |
| 3,298,794 | 1/1967 | Mikesell, Jr. et al. | 220/378 |
| 3,593,878 | 7/1971 | Hertell | 220/328 |
| 3,599,825 | 8/1971 | Jorgensen | 220/378 |
| 3,782,587 | 1/1974 | Brothers | 220/378 |
| 3,951,301 | 4/1976 | Meginnis | 220/328 |

Primary Examiner—Joseph Man-Fu Moy

[57] ABSTRACT

A closure assembly is provided for sealing vessel manways, coke drums and other high temperature connections. It includes a cover member, a substantially cylindrical retaining member, a crush ring slidable with respect to the retaining member, a stop member, and a sealing ring positioned between an end of the crush ring and the stop member. Tightening screws or bolts pass through the cover member and contact the crush ring. They may be employed for moving the crush ring toward the stop member thereby compressing the sealing ring. The sealing ring may be a graphite ribbon wrapped a number of times about the retaining member.

7 Claims, 2 Drawing Figures

CLOSURE ASSEMBLY

BACKGROUND OF THE INVENTION

1. Field of the Invention.

The field of the invention relates to a closure assembly which allows a seal to be tightened after a closure member has been applied to a vessel.

2. Brief Description of the Prior Art.

Removable closure assemblies have been used for many applications. An O-ring is commonly employed between a closure member and a vessel to improve the seal therebetween. U.S. Pat. No. 4,288,001 discloses such a closure assembly employed for providing access to a pressure device. The presence of an O-ring limits the operating temperature of the device to about 500° F.

High temperature openings are sealed by a blind flange and gasket with bolting. Removal of the manway is time consuming.

SUMMARY OF THE INVENTION

A closure assembly is provided which includes a closure member having an inner surface and an outer surface, a retaining ring extending from the inner surface thereof, a crush ring slidably positioned within the retaining ring, a stop member, and a sealing ring positioned between the crush ring and the stop member. A plurality of screws extend through the closure member such that they may urge the crush ring in the direction of the stop member. The sealing ring may be compressed in this manner. The stop member may be an integral portion of the retaining ring and project inwardly therefrom.

To allow high temperature application, a ribbon of expanded graphite material such as Grafoil may be employed for the sealing ring. Grafoil is commonly sold as a high temperature pump or valve packing. The ribbon is crushed by the crush ring to create the seal. This construction is particularly applicable for vessel manways, coke drum closures, or other high temperature connections.

DETAILED DESCRIPTION OF THE INVENTION

Figure 1:
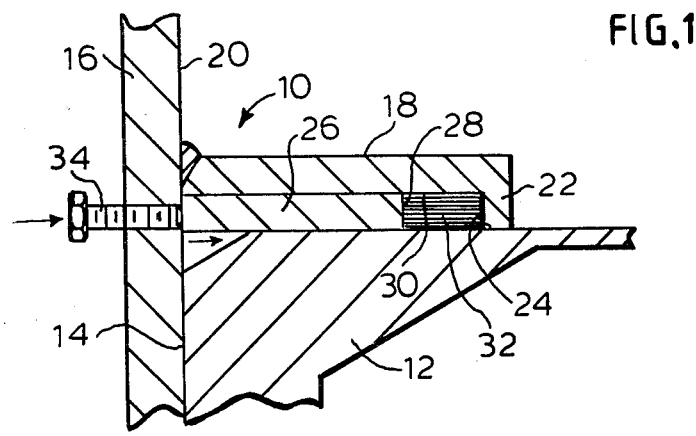
FIG. 1 is a sectional view illustrating a portion of a closure assembly prior to compression of a sealing ring.
Figure 2:
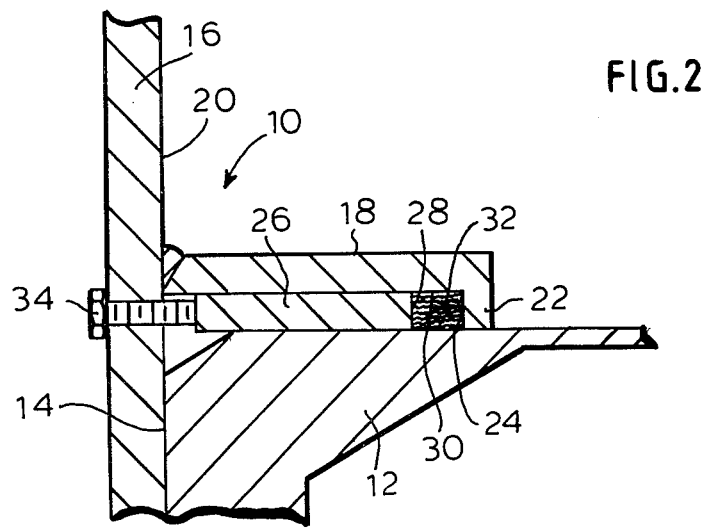
FIG. 2 is the same view as FIG. 1 after compression of the sealing ring.

A closure assembly 10 is provided for removably sealing a pressure vessel. An annular flange 12 extending from such a vessel is shown in FIGS. 1-2. The flange 12 provides a flat seating surface 14 for receiving a cover 16. The cover 16 may be attached to the flange 12 by means of clamps or bolts (not shown).

A substantially cylindrical retaining member 18 extends substantially perpendicularly from the inner surface 20 of the cover 16 and is welded thereto. This member 18 includes a cylindrical body portion and an annular flange 22 extending radially outwardly from its inner end. The retaining member 18 and flange 22 may be of integral construction as shown. Alternatively, the flange 22 may be a flat ring bolted to the inner end of the retaining member. It could also be welded to flange 12 rather than being attached to the retaining member 18 at all. The flange 22 defines a shoulder stop 24 in all proposed configurations.

A crush ring 26 having a substantially cylindrical body is coaxial with and surrounds the retaining member 18. It is slidable along the exterior surface thereof and is coaxial therewith. The inner end 28 of the crush ring 26 and the shoulder stop 24 define a groove 30 for receiving a sealing ring 32. The sealing ring is preferably a ribbon of expanded graphite material which is wrapped a number of times about the retaining member 18. This ribbon is commercially available under the name of Grafoil. The required number of layers is variable depending upon the intended application of the closure assembly. The sealing ring must be able to contact both the interior wall of the flange 12 and the exterior wall of the retaining member 18 as explained below.

A plurality of tightening bolts 34 extend through a plurality of bores provided within the cover 16. The bolts are threaded such that they can be turned into or out of the bores. The tips of the bolts are in contact with the outer end of the crush ring 26. A sufficient number of bolts are provided such that substantially even pressure can be applied to the sealing ring 32 by means of the crush ring 26.

To install the closure assembly 10, the Grafoil ribbon is wrapped about the retaining member 18 in the groove 30 defined between the crush ring 26 and the retainer flange 22. The cover 16 is mounted to the pressure vessel 12 and secured thereto. The crush ring bolts 34 are tightened in such a manner that substantially uniform pressure is applied by the crush ring upon the sealing ring 32. The layers of ribbon are thereby wrinkled providing an expanded sealing ring. If there is leakage, tightening the bolts 34 should provide a tighter seal.

Under high temperature, the sealing ring 32 expands to tighten the seal. The retaining member 18 and crush ring 26 also expand creating a metal-to-metal seal.

What is claimed is:

1. A closure assembly comprising:
    a cover member having an outer surface and an inner surface;
    a substantially cylindrical retaining member projecting from said inner surface of said cover member;
    a circumferential flange extending radially with respect to said retaining member;
    a substantially cylindrical crush ring positioned adjacent to and coaxial with said retaining member, said crush ring being slidable with respect to said retaining member and having an end in opposing relation to said circumferential flange;
    a sealing ring positioned between said end of said crush ring and said circumferential flange; and
    tightening means extending through said cover member and capable of moving said crush ring towards said circumferential flange thereby compressing said sealing ring.

2. A closure assembly as defined in claim 1 wherein said sealing ring is a ribbon wrapped a plurality of times about the axis of said retaining member.

3. A closure assembly as defined in claim 1 wherein said circumferential flange extends radially outwardly with respect to said retaining member.

4. A closure member as defined in claim 1 wherein said tightening means includes a plurality of tightening bolts.

5. A closure assembly as defined in claim 1 wherein said circumferential flange is secured to said retaining member.

6. A closure assembly as defined in claim 3 including an annular flange member coaxial with and in contact with said crush ring and said sealing ring.

7. A closure assembly as defined in claim 2 wherein said ribbon is of graphite material.

* * * * *